United States Patent [19]

Eumurian et al.

[11] Patent Number: 4,691,386
[45] Date of Patent: Sep. 1, 1987

[54] OPTICAL TRANSMISSION CHANNEL WITH ELECTRICAL CONNECTORS

[75] Inventors: Gregoire Eumurian, Argenteuil; Albert Courty, Ville D'Avray, both of France

[73] Assignee: Thomson-CSF, Paris, France

[21] Appl. No.: 675,799

[22] Filed: Nov. 28, 1984

[30] Foreign Application Priority Data

Dec. 2, 1983 [FR] France ............... 83 19320

[51] Int. Cl.$^4$ ............................................. H04B 9/00
[52] U.S. Cl. ................ 455/607; 455/612; 455/613; 455/617; 455/618; 455/619
[58] Field of Search ........... 455/606, 607, 610, 612, 455/613, 617, 618, 619

[56] References Cited

U.S. PATENT DOCUMENTS

| | | | |
|---|---|---|---|
| 3,984,824 | 10/1976 | Blackburn | 455/612 |
| 4,207,459 | 6/1980 | Nakamura et al. | 455/613 |
| 4,291,943 | 9/1981 | Binek | 350/96.22 |
| 4,307,934 | 12/1981 | Palmer | 350/96.20 |

FOREIGN PATENT DOCUMENTS

2258782 6/1974 Fed. Rep. of Germany.

OTHER PUBLICATIONS

Sandbank-Optical Fibre Communication Systems—John Wiley & Sons—1980, pp. 229,312.
Cotton et al., "Fiber Optic Digital", -Spie, vol. 139, Guided wave Optical Systems and Devices, 1978, pp. 53-62.
Kurosawa et al., Show a Wire & Cable Rev (Japan), vol. 29, #2, 1979, pp. 47-56.
Unwin-A High Speed Optical Receiver-Optical and Quantum Electronics, 14, No. 1, Jan. 1982, pp. 61-66.
Null-"Three Technologies"-Electronic Design—May 24, 1980, pp. 65-68.
Schmid, Electronics, "Fiber-optic Data Transmission: A Practical, Low-cost Technology", vol. 49, No. 18, Sep. 2, 1976, pp. 97-99.
Gilder, Electronic Design, "Fiber-optic Communications Seen Approaching Applications Stage", vol. 23, No. 14, Jul. 5, 1975, pp. 30, 32.
Asatani, et al., Electronics Letters, "Nonlinear Phase Distortion and Its Compensation in L.E.D. Direct Modulation", vol. 13, No. 6, Mar. 17, 1977, pp. 162, 163.

*Primary Examiner*—Joseph A. Orsino, Jr.
*Attorney, Agent, or Firm*—Pollock, VandeSande & Priddy

[57] ABSTRACT

An optical transmission channel permitting terminal electrical connection with operating characteristics in a very wide frequency band, while maintaining the transfer function constant. It comprises an optical cable terminated at each end by a module containing, for each link, an emitting or receiving diode as a function of the particular case and its associated electronic circuit. The optical coupling is performed by a detachable optical connector within the module and each circuit has a frequency compensating circuit to produce a phase lead and accentuate the high frequencies.

10 Claims, 10 Drawing Figures

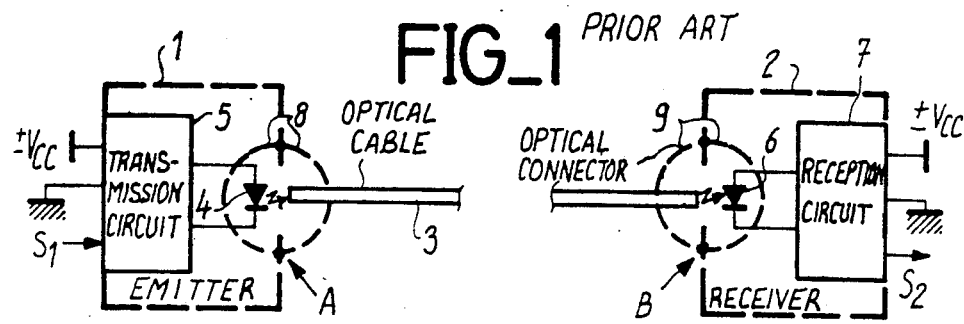
FIG_1 PRIOR ART
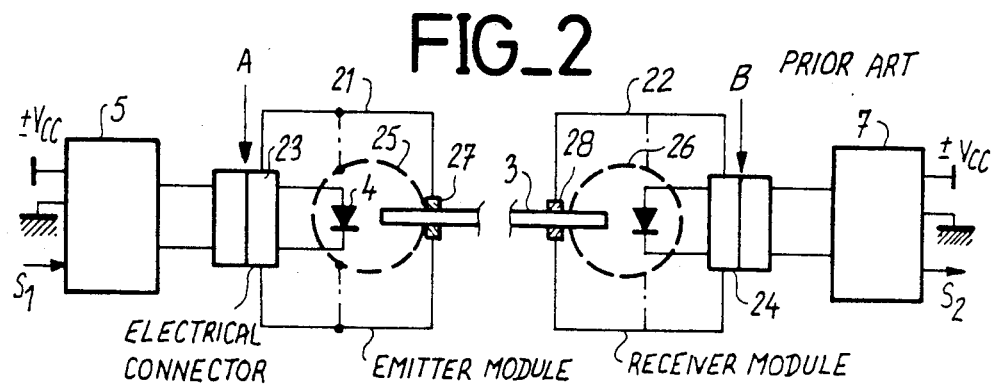
FIG_2 PRIOR ART
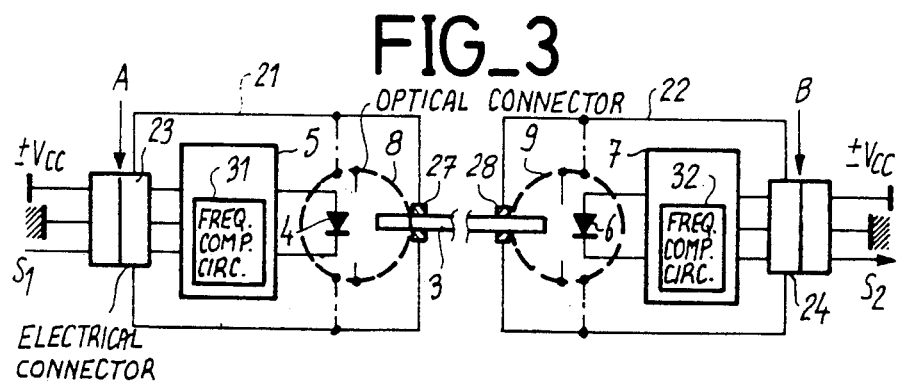
FIG_3
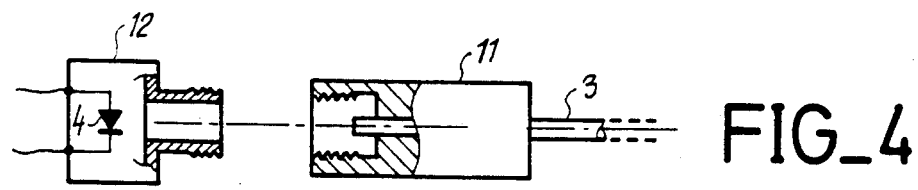
FIG_4
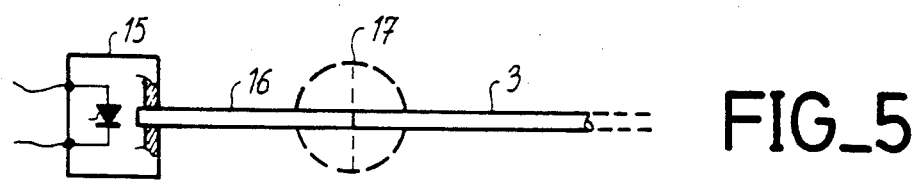
FIG_5

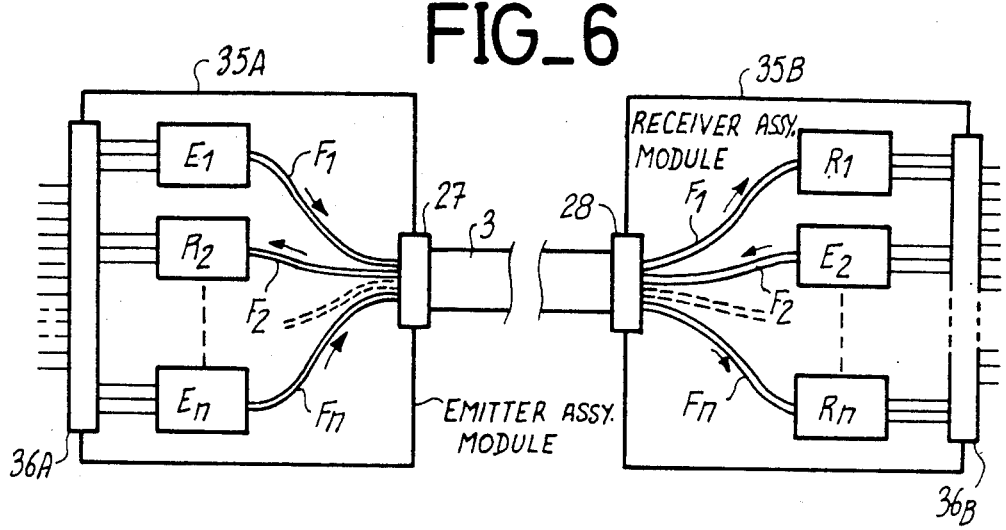
FIG_6
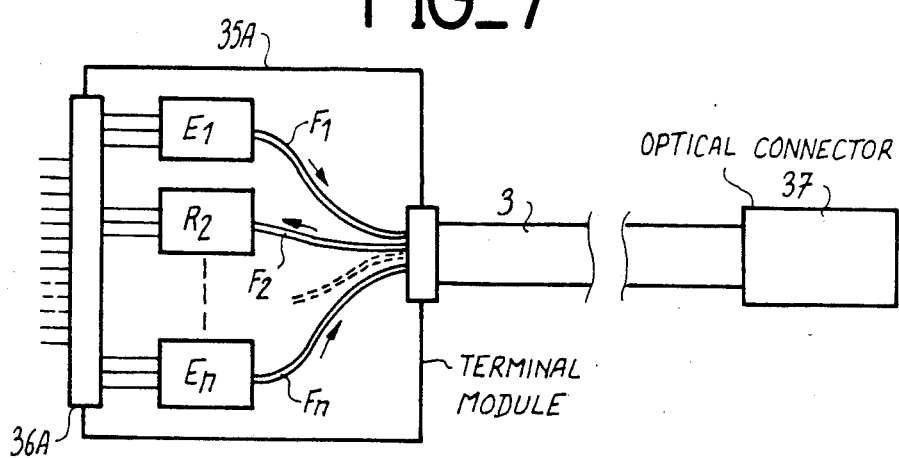
FIG_7
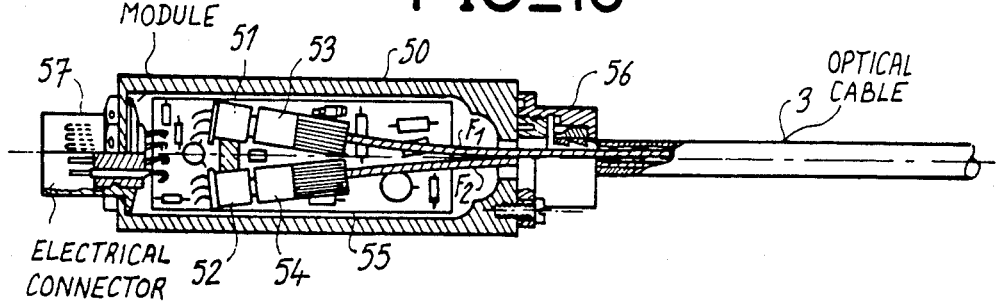
FIG_10

FIG_8
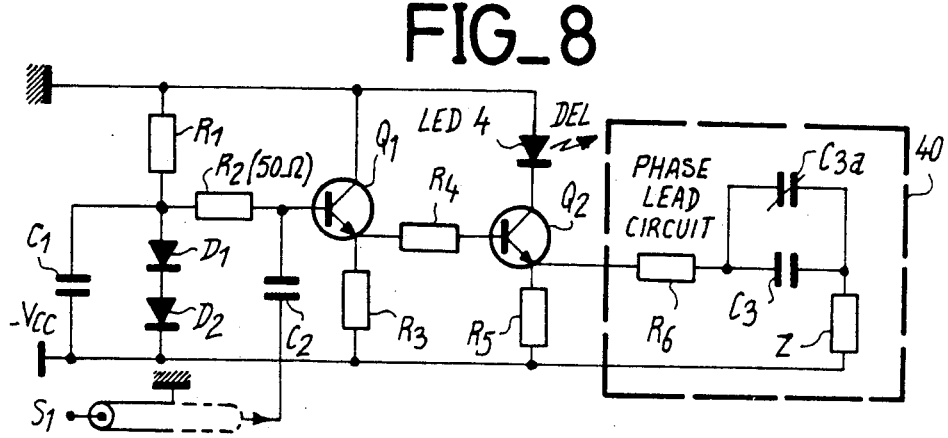
FIG_9
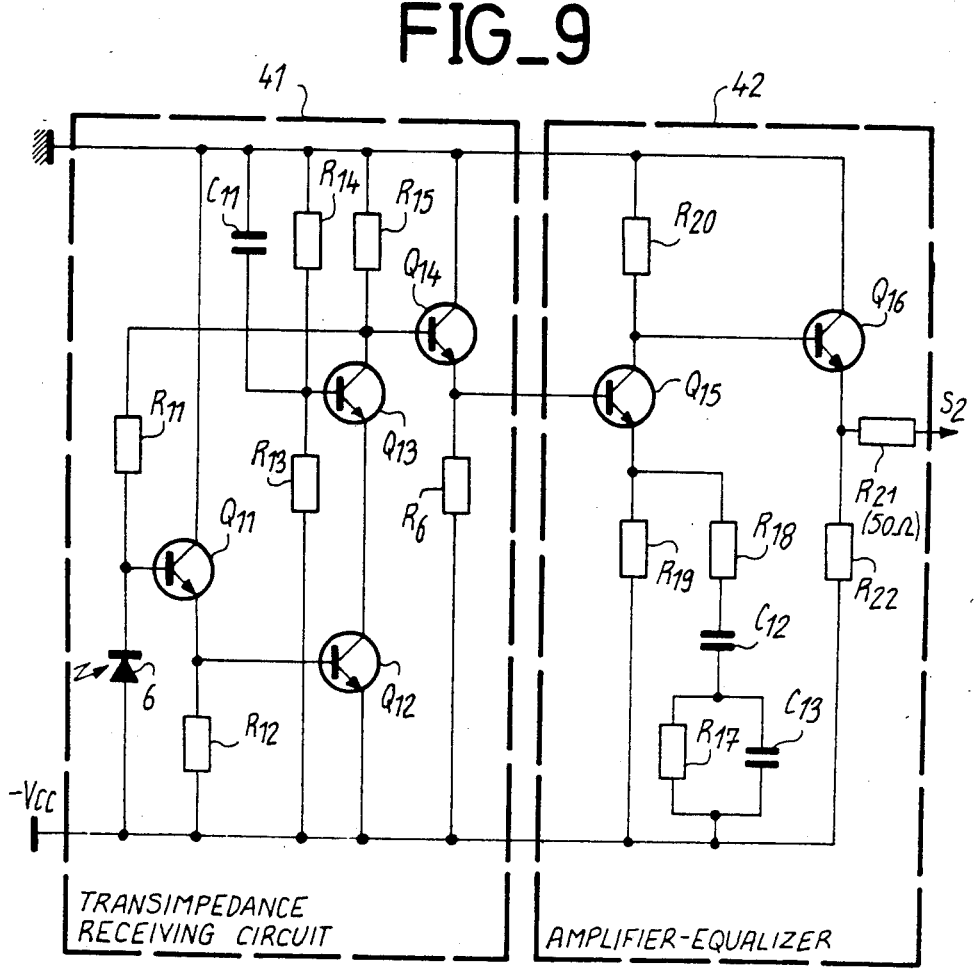

OPTICAL TRANSMISSION CHANNEL WITH ELECTRICAL CONNECTORS

BACKGROUND OF THE INVENTION

The present invention relates to optical transmission channel with electrical connectors.

The term optical transmission channel is understood to mean the assembly formed by an electrooptical emitter connected by an optical cable to an optoelectronic receiver. The emitter performs the electrical/optical conversion of the signal corresponding to the information to be transmitted, the optical cable carries the light signal supplied by the emitter and the receiver performs the reverse optical/electrical transformation of the light signal transmitted by the cable to restore it to electrical form. The respective conversions are obtained by end or terminal diodes. At the output, the emitter uses a photoemitting diode of the light-emitting diode type, or of the laser diode type. The receiver uses at the input a photodetecting diode of the PIN type or the APD type (avalanche photodiode). Each of these diodes is accurately positioned relative to the end face of the cable associated therewithin in order to obtain a good optical coupling and good mechanical characteristics.

According to the most widely used constructions, the optical coupling at the end of the cable is carried out with the aid of appropriate optical connectors, so as to facilitate the connection - disconnection operations for the purpose of fitting, removing or changing the optical cable, or for disconnecting the latter from the emitter and/or the receiver.

According to other known constructions, the cable connection - disconnection level is moved upstream of the emitting diode and downstream of the receiving diode. The terminal optical connectors can thus be replaced by electrical connectors making it possible to connect the electrodes of the terminal diodes to the corresponding circuit. Thus, it is possible to benefit from the advantages of this type of connection, while avoiding the disadvantages of optical connectors. Thus, the repeated handling of optical connectors leads to mechanical wear, which rapidly brings about a loss of power and a modification to the pass band of the optical conductors or conductors forming the cable (one fiber or a bundle of fibers) of the emitter - receiver link in question. However, in the case of electrical connectors, the aging of the connector is very slow and only leads to a slight increase in the ohmic resistance. This increase is so low that it has virtually no effect on the transfer function of the link. As a function of these solutions, the ends of the cable are terminated by a module including the terminal diode optically coupled to the cable and connected to an electrical connector. The optical coupling is obtained by an arrangement ensuring the relative mechanical positioning of the elements without actually using optical connectors. Electrical connector is of the coaxial or multipin type.

These constructions with terminal electrical connectors for the cable operate satisfactorily when the frequency band used is relatively low, not exceeding a few MHz for the highest frequencies. However, beyond this level, these lengths of the connections connecting the terminal diode to the corresponding electronic circuit across the terminal electrical connector have an influence which increases with the frequency and which modifies the transfer function of the system. If it is wished to obtain higher performance systems, whose high frequencies can easily reach several hundred MHz or even exceed 1 GHz, it is found that each of these components, i.e. diode or fiber, has an increasing influence on the response of the link. For example, for an optical fiber of type 50/125 (core diameter/sheath diameter in microns) and on considering elements of fibres with the same length, the high frequency transmitted can easily vary in the range 200 MHz to 1.2 GHZ on changing the cable element, i.e. in a ratio ranging from 1 to 6.

SUMMARY OF THE INVENTION

One object of the invention is to provide a transmission channel with optical connectors obviating the aforementioned disadvantages, so as to preserve the constant transfer function for operation in a very wide frequency band.

Another object of the invention is to provide easy internal connection - disconnection possibilities at the ends of the cable, so as to facilitate possible changes of components, i.e. terminal diode or cable, as a function of the operating requirements or in the case of a failure. Moreover, the circuits are preferably such that they produce a frequency compensation making it possible to essentially retain the characteristics of the transfer function, while permitting a greater operating flexibility.

The present invention therefore proposes an optical transmission channel with electrical connectors, formed from an optical cable connecting an electrooptical emitter to an optoelectrical receiver, the emitter and the receiver each having an electronic circuit associated with a terminal transducer diode respectively photoemitting and photoreceiving, the cable being terminated at each end by an electrical connection module, each of them containing the corresponding terminal diode with a device for optically coupling said diode to the end of the optical cable associated therewith and being terminated by an electrical connector for electrically connecting the terminal diode to the corresponding circuit and wherein each module contains both a terminal diode and the corresponding circuit, so that the external connections across the electrical connector have no influence on the characteristics of the pass band on the channel and permit operation in a very wide frequency band.

BRIEF DESCRIPTION OF THE DRAWINGS

The invention is described in greater detail hereinafter relative to non-limitative embodiments and the attached drawings, wherein show:

FIG. 1 an optical transmission channel with optical connectors of a known type.

FIG. 2 an optical transmission channel with electrical connectors of a known type.

FIG. 3 an optical transmission channel with electrical connectors according to the invention.

FIGS. 4 and 5 diagrams giving information on the optical coupling modes between the terminal diode and the optical cable.

FIG. 6 a multiple transmission channel according to the invention.

FIG. 7 a constructional variant of the invention relating to the requirements of passing the cable through a narrow opening.

FIG. 8 an electrical diagram of an electro-optical emitter and a frequency compensating circuit used in a transmission channel according to the invention.

FIG. 9 an electrical diagram of an optoelectrical receiver with a frequency compensating circuit used in a transmission channel according to the invention.

FIG. 10 an embodiment of the terminal module of the cable for a bidirectional transmission channel according to the invention.

DETAILED DESCRIPTION OF THE PREFERRED EMBODIMENTS

With reference to FIG. 1, the optical transmission channel comprises an electro-optical emitter assembly 1 connected to an optoelectronic receiver assembly 2 by cable 3, constituted by an optical fiber or a bundle of fibers. Emitter 1 comprises a photoemitting diode 4 and its associated circuit 5. In the same way, receiver 2 comprises a photodetecting diode 6 and its associated circuit 7. The ends of the optical conductor 3 are optically coupled to diodes 4 and 6 by optical connectors 8, 9 respectively.

The external electrical links comprise continuous supply connections (±Vcc and earth) of the transmission and reception circuits and those relative to the signal S1 (analog or digital) to be transmitted, and to the signal S2 restored at the output of the receiver.

As is shown in FIG. 4, optical coupling can be carried out with a hybrid connector formed from a first part 11 containing the end of the cable which is to be fixed to a second part 12 containing the terminal diode 4 or 6. Components 4 and 3 (or 6 and 3) are placed in position by fixing, e.g. by screwing.

As shown in FIG. 5, other coupling modes are possible when the diode 15 is terminated by an optical fiber or pigtail 16. Thus, two optical conductors 16 and 3 are coupled. In the case of rare disassemblies, it is possible to use splicing, which consists of joining the ends of these optical conductors by welding, adhesion, or any other means. Preference is given to the use of an optical connector 17. Different types thereof exist for mechanically and optically coupling two monofiber or multifiber optical conductors. For the connection requirements according to the invention, connector 17 must be miniaturized.

For a transmission channel using optical conductors, the transfer function is virtually never constant and essentially varies as a function of the influence of temperature and ageing on the terminal diodes of the emitter and the receiver and on the optical connectors and, in the case of the latter, the state of the optical surfaces and their degree of cleanliness.

Among the terminal or end components, lightemitting diodes (LED) and PIN reception diodes are relatively stable. The optical power of the pass band of the LED varies moderately as a function of temperature. The PIN diode is virtually invariable as a function of temperature. However, laser emission diodes, which have the advantage of emitting 10 times more power then LED, vary considerably as a function of the temperature, as do avalanche photodiodes.

The optical connectors 8 and 9 in these links are used in the same way as conventional connectors for disconnecting or reconnecting at A and B, as indicated in FIG. 1, cable 3 of emitter 1 or receiver 2.

As has been stated hereinbefore, these manipulations of the optical connectors lead to mechanical wear, which brings about both a power loss and a modification of the pass band of the fiber or bundle of fibers 3. Thus, the frequency response of a fiber is dependent on the numerical aperture (the numerical aperture represents the sine of the output or injection semi-angle) for injection on emission and the reception numerical aperture at the fiber outlet. The modification of the numerical aperture is largely due to the distance between the optical surfaces to be coupled. The reduction in the numerical aperture leads to a modal filtering, which tends to increase the pass band.

The deterioration of the optical connector leads both to a power loss and to a modification of the pass band. Moreover, the deposition of impurites on the optical surfaces also leads to modifications of the transmitted power and the numerical aperture. This is important, particularly in the case of links with a small diameter monofibre. In order to retain the response characteristics of the channel, i.e. for stabilizing the transfer function, it is known to use a thermostatic temperature control of the enclosure in which the terminal diode is placed or to control the transmission power by using a photodiode close to the emitting diode, or through the use of an automatic gain control.

Another known solution referred to with the aid of FIG. 2 consists of terminating cable 3 by modules 21 and 22 containing terminal diodes 4 and 6 and provided with an electrical connector 23, 24 at the end for the external connection to the transmission circuit 5 and reception circuit 7 respectively. Within the module, mechanical means 25 and 26 ensure the correct positioning of the diode facing the end of the cable and renders integral these elements of the box or case of module 21, 22. The aforementioned connection or disconnection levels A and B are now moved upstream of the emitting diode 4 and downstream of the receiving diode 6 and are realized with electrical connectors whereof the wear, as has been stated, has virtually no influence on the transfer function. The mechanical fixing and coupling means 25, 26 can have a cable clip or clamp 27, 28 at the inlet or intake of the module.

According to the present invention, in order to improve performance and eliminate the influence on the pass band of the external connections passing from the electrical connectors 23, 24 to the external circuits 5 and 7, the latter are integrated into the case of the corresponding module, as indicated in FIG. 3.

Thus, all that remains to the outside are connections with no effect on the transfer function, i.e. the continuous power supply leads and signals S1 and S2, which connections leading to the corresponding electrical connector 23 or 24 formed from a multipin plug and a corresponding socket.

Moreover, the electrical circuits 5 and 7 advantageously have a frequency compensating circuit 31, 32 with a high-pass effect, so as to compensate the attenuation of the fiber, or a possible excessive spacing between the diode and the end face of the cable to which it is coupled.

The coupling between the optical fiber leaving the cable clip 27, 28 and the terminal component 4, 6 is ensured by a fixed or dismantlable arrangement. The first category more particularly covers the connection by splicing a pigtail diode. The second category covers diode - fiber (elements 11,12 in FIG. 4) or fiber - fiber (element 17 in FIG. 5) optical connectors 8, 9, as a function of the diode type. Optical connector coupling permits easier access to the terminal diode or to the cable when it is necessary to change an element.

The existence of a miniature internal optical connector has none of the disadvantages of the external optical connector (FIG. 1). Thus, this connector is only used during the integration phase of the assembly and possibly for maintenance purposes. During normal operation, said connector is always locked and is subject to no aging or pollution risks.

The use of an optical junction by internal splicing makes it possible to obtain a similar result with the advantage of a smaller optical power loss, but with the disadvantage of more difficult detachability.

FIG. 6 relates to the case of multiple channels, i.e. having several emitters and/or receivers at each end. Cable 3 has the same number of optical conductors F1 to Fn (each of them being constituted by a fiber or a bundle of fibres) as there are links to be made, n emitters to n receivers respectively. Each of the blocks E1, R1 ... Rn, Rn assembles a terminal diode to its circuit and the coupling to the corresponding fibre F1 ... Fn. Thus, modules 35A and 35B have larger dimensions. The terminal electrical connections 36A, 36B assemble all the external connections for n internal circuits to the module, constituted by emitters and/or receivers.

In certain cases of use, it is necessary to be able to pass the optical cable through small diameter openings. In this case, it is possible to fit the emission or reception assembly or assemblies in a module 22 or 21 (FIG. 3) or 35A or 35B (FIG. 6) at one end of the cable, which can be frequently connected and disconnected, while terminating the other end of the optical cable 3 by a monochannel or multichannel optical connector 37 (FIG. 7), said second end only being occasionally connected or disconnected. Although this solution does not have as good performance characteristics as that using electrical connectors at each end, it makes it possible to achieve through the reduced size of the optical connector 37 used alone, a very small cable passage opening diameter.

FIG. 8 shows an embodiment of the transmission circuit with a frequency compensating circuit 40 or phase lead circuit.

Transistor Q1, connected as a common collector, ensures the input matching (50 OHm input impedance) (low output impedance). Resistors R1 and R3, as well as diodes D1 and D2 ensures a temperature-invariable polarization of these transistors. Capacitor C1 ensures the dynamic earthing of one of the ends of the 50 Ohm input resistor R2.

The second stage, formed around transistor Q2, makes it possible to perform the voltage - current transformation of the input signal. The variation of the current in the diode 4 is given by the voltage variation of the input signal S1 divided by the impedance of the circuit formed by resistor R5 in parallel with compensating circuit 40. The latter is constituted by resistor R6, capacitor C3 and impedance Z. For a given polarizing circuit (R5 fixed), the choice of R6, C3 and Z makes it possible to obtain a varying phase lead. In order to facilitate settings or controls, an adjustable element is used, such as a variable capacitor C3a connected in parallel with C3. Part Z is a function of the length of the cable. For example, impedance Z is constituted by a resistor and a capacitor in parallel for a 50 meter cable, is 0 for a length of 100 meters and is inductive for a longer cable of 150, 200 or more meters.

FIG. 9 relates to an embodiment of the receiving part, also with a frequency compensating circuit 42 downstream of receiving circuit 41, which is of the trans-impedance type.

Receiving circuit 41 has a high gain, broadband amplifier realized around transistors Q11 and Q14 ensuring impedance matching and transistors Q12 and Q13 forming a low input capacitance cascode arrangement. Resistor R11 produces a negative feedback. The voltage at the output of transistor Q14 is substantially equal to the product of resistor R11 by the current flowing in photodetecting diode 6.

The following circuit 42 constitutes an amplifier - equalizer. It ensures the frequency compensation towards the high frequencies, or the phase lead, as well as the impedance matching (50 ohms). It incorporates transistors Q15 and Q16. The phase lead is produced by elements R17, R18, R19, C12 and C13 and is of the same type as that realized at the transmission circuit.

FIG. 10 shows a construction to scale of approximately 70×25×25 mm of a cable end module 15. In this case, there are two terminal diodes 51, 52, preferably one for emission and the other for reception for effecting a bidirectional transmission along the cable equipped in the same way at the other end. There are miniature optical connectors 53, 54 which couple the diodes to the fibers (or to multifiber conductors) F1 and F2 respectively. The emission and reception electronic circuits associated with the diodes are connected in miniaturized form to a printed card 55. The other elements comprise a cable clip arrangement 56 and on the opposite side the multipin electrical connector 57. Moreover, a not shown cover is used for closing the module case after fitting or after access to the elements for maintenance purposes. Gaskets are advantageously located between the cover and the case and on the end fittings 57, 56.

The aforementioned solutions lead to the following advantages. Unlike optical connectors, which are very sensitive to mechanical wear, dust and other contaminants, electrical connectors are substantially insensitive and the transfer function of the optical cable does not undergo modifications at each connection - disconnection. In the case of multichannel links, it is difficult to obtain reliable multichannel optical connectors, whereas the construction of multichannel electrical connectors causes no problems. The stability of the transfer function of the optical fiber due to a constant inlet numerical aperture (by maintaining the diode-fiber spacing) permits electrically performed compensations, particularly with the aim of widening the pass band. The increasing of the pass band is carried out by accentuating the high frequencies attenuated most by the optical fiber. The compensation also makes it possible to obviate modal filtering due to an excessive distance between the diode and the fiber. The standardization of the equipment as a result of the frequency compensation and the ease of operating and maintaining the device offer high reliability and high performance characteristics. The invention replaces a clearly defined, stable assembly by another clearly defined stable assembly of an equivalent type—it is pointed out that the replacement of the optical cable in systems with conventional optical connectors leads to a possibly large modification of the transfer function.

What is claimed is:

1. An optical transmission channel, comprising:
   an optical cable having at least two optical fibers;
   first and second modules connected to respective first and second ends of the optical cable, each of the modules having;
   (a) a housing;

(b) means coupled to the housing for clamping a sheath of the optical cable in a fixed position to one end of the module;

(c) means for fixing photoemitting and photoreceiving diodes within the housing;

(d) first means for fixedly coupling an end of the first of the at least two optical fibers to the photoemitting diode, the photoemitting diode being connected to a first electronic circuit;

(e) second means for fixedly coupling the second of the at least two optical fibers to the photoreceiving diode, the photoreceiving diode being connected to a second electronic circuit;

(f) means for fixedly mounting the first and second electronic circuits within the housing; each of the first and second electronic circuits including a frequency compensating circuit for producing a phase lead to accentuate high frequencies attenuated by the optical cable and to permit operations in a widened frequency band, each of the frequency compensating circuits comprising in series a resistor, a capacitor and an impedance element of impedance determined with respect to a length of the cable, one of the frequency compensating circuits further having an adjustable capacitor connected in parallel with said capacitor for accurately setting the phase lead;

(g) means coupled to the fixing mounting means and electrically connected to the first and second electronic circuits for connecting the module to an external electrical linking means;

thereby providing for a transmission channel having a constant transfer function.

2. A transmission channel according to claim 1, wherein the first and second fixedly coupling means comprise miniature optical connectors to provide a diode-fiber connection.

3. A transmission channel according to claim 1, wherein the first and second fixedly coupling means comprise a fiber-fiber connection for a pigtail-type terminal diode.

4. A transmission channel according to claim 1, wherein at least one of said diodes is a pigtail type terminal diode, and wherein the first and second fixedly coupling means provide a splice between one end of the pigtail type terminal diode and one end of the cable.

5. A transmission channel according to any one of claims 1, 2, 3 or 4, wherein each module has at least two terminal diodes and corresponding circuits for forming a multiple channel of emitters and receivers, the cable having a plurality of monofiber optical conductors or a multifiber optical conductor, each of the monofiber conductors and each fiber of the multifiber optical conductor being used for connecting at least one of the emitters and receivers of the module to corresponding at least one of the receivers and emitters, respectively, of a matching module.

6. A transmission channel according to claim 5, wherein each module has an emitter and a receiver, each module being connected to the cable for realizing a bidirectional link.

7. A transmission channel according to claim 1, wherein one of the ends of the cable is solely equipped with a miniature optical connector.

8. A transmission channel according to claim 1, wherein the photoemitting diode comprises a laser or lightemitting diode; and wherein the photoreceiving diode comprises a PIN or avalanche diode.

9. A transmission channel according to claim 1, wherein the connecting means are connected to the external electrical linking means for receiving signals and for transmitting received signals and wherein the connecting means are further connected to power supplies for receiving power therefrom.

10. A transmission channel according to claim 1, wherein said impedance element comprises a resistor in parallel with a capacitor, for cables of length of about 50 meters, or said impedance element is a null element for cables of length of about 100 meters, and said impedance element is inductive for cables of length exceeding about 150 meters.

* * * * *